United States Patent [19]
Rivola et al.

[11] 3,909,439
[45] Sept. 30, 1975

[54] PROCESS FOR THE PRODUCTION OF ALUMINUM CHLOROHYDROXIDES

[75] Inventors: Luigi Rivola; Bruno Notari, both of San Donato Milanese, Italy

[73] Assignee: Snam Progetti S.p.A., San Donato Milanese, Italy

[22] Filed: Feb. 28, 1973

[21] Appl. No.: 336,753

[30] Foreign Application Priority Data
Mar. 1, 1972  Italy............................ 21252/72

[52] U.S. Cl.............. 252/187 R; 423/472; 423/127
[51] Int. Cl.$^2$..... C01F 7/00; C01F 7/22; C01F 7/56
[58] Field of Search........ 252/187 R; 423/462, 127, 423/472

[56] References Cited
UNITED STATES PATENTS
3,113,911   12/1963   Jones.................................. 204/252

Primary Examiner—Benjamin R. Padgett
Assistant Examiner—B. Hunt
Attorney, Agent, or Firm—Ralph M. Watson, Esq.

[57] ABSTRACT

Aluminum chlorohydroxide represented by the formula: $Al_2(OH)_x Cl_y$, wherein $x$ and $y$ range from 1 to 3.5 and 5 to 2.5, respectively, is produced by reacting aluminum oxide or hydroxide with an amount of hydrochloric acid which is (1/2.5) to (1/4) of the stoichiometric amount for obtaining aluminum trichloride, at a temperature in the range from 100°C to 160°C, and at a pressure in the range from 0.1 kg/cm$^2$ to 4 kg/cm$^2$ for a period of from 2 to 10 hours.

2 Claims, No Drawings

PROCESS FOR THE PRODUCTION OF ALUMINUM CHLOROHYDROXIDES

The present invention relates to a process for the production of aluminum chlorohydroxides.

More particularly the present invention relates to a process for the production of aluminium chlorohydroxides having the general formula $Al_2(OH)_xCl_y$ wherein $x$ and $y$ may range from 1 to 3.5 and from 5 to 2.5 respectively.

It is known that alumina is attacked by hydrochloric acid, and the reaction gives rise to aluminum trichloride, particularly when the amount of hydrochloric acid employed is higher than the stoichiometric one.

It has now been found that, by employing an amount of aluminum oxide or hydroxide in excess of the stoichiometric one necessary for obtaining the trichloride the reaction proceeds to the formation of chlorohydroxides having the above formula under appropriate working conditions.

According to the process of the present invention use may be made of alumina Bayer, bauxite, bayerite, gibbsite, hydrargillit, diaspore, boemite of as to the more common types, but it is possible to use, as starting material, any aluminum oxide or hydroxide.

The inventive process consistis in attacking the starting material with hydrochloric acid, in an amount which is from (1 to 1/4)/2.5 the stoichiometric amount for obtaining the trichloride.

The reaction occurs at temperatures ranging from 100° to 160°C, and at pressures ranging from 0.1 kg/cm² to 4 kg/cm² and is completed after 2 to 10 hours from the beginning.

A part of alumina added in excess does not react and remains as a solid residue, which can be removed and fed again to the etching reactor. Its reactivity is quite similar to the one of the product originally fed.

The employed aluminas can possess particles of various size.

Particular advantages have been realized by using products with particles having 500 – 1,000 A diameter. However the preparation of oxides and hydroxides having such small sizes is not convenient from an economical point of view. Therefore, materials with sizes ranging from a few microns to a few hundred microns are also employable in the process described.

The chlorohydroxides obtained according to the inventive process may be employed as follows: preparation of γ-alumina as an active basis of catalysts, mordanting textile fibers, in the cosmetics industry as, for instance, in antisudorific powders.

The inventive process will be better understood through consideration of the following illustrative examples.

EXAMPLE 1

Use was made of alumina Bayer, having particles with a 40 – 70 u diameter, $(Al_2O_3 .. 3 H_2O)$ and the following nominal composition (by weight):

| | |
|---|---|
| $Al_2O_3$ | 64.9 – 65.1 % |
| Total $Na_2O$ | 0.4 % |
| Soluble $Na_2O$ | 0.045 % |
| Si | 0.009 % |
| Fe | 0.012 % |
| Ti | 0.003 % |
| P | 0.001 % |
| V | 0.0005% |
| $H_2O$ at 110°C | 0.1 % |
| $H_2O$ at 1000°C | 35.0 % |

Alumina Bayer was attacked with an aqueous solution of hydrochloric acid at 37 % $(d = 1.19)$.

The reaction was performed with 100 kg of H Cl in a Pyrex glass or enameled steel reactor at a temperature ranging between 120°C and 140°C, the reactor being kept under an inert gas atmosphere of from 0.8 to 1.5 kg/cm² and a strong mechanical stirring.

After 4 hours run, the suspension was diluted with 25 liters of distilled water containing 100 g of H Cl $(d = 1.19)$, discharged from reactor and centrifuged by means of a basket centrifuge of Incoloy 825 after cooling at a temperature ranging from 50° to 85°C, by means of a heat exchanger in Incoloy 825.

Following the etching 50 % of Alumina Bayer charged into the reactor (~ 50 kg) is solubilized. Therefore the solid residue from the centrifuge was put again in the etching reactor, and the starting amount was restored with 50 kg of fresh Alumina Bayer. 100 kg of H Cl $(d = 1.19)$ were again added to the reactor and the etching was again carried out as described above.

The composition, pH and the density of the chlorohydroxide obtained from the etching, after the removal of the solid residue, were the following ones:

| | | |
|---|---|---|
| $Al_2O_3$ | 19.5 – 20.5 % | (by weight) |
| Cl | 21.0 – 22.0 % | (by weight) |
| Fe | 80 | p.p.m. |
| Na | 13.50 | p.p.m. |
| d 20°C | 1.39 – 1.42 | |
| pH 20°C | 0.85 – 1.00 | |

The weight ratio between Al and Cl is 0.46 – 0.54, which corresponds to an approximate composition of $Al_2(OH)_3Cl_3$

EXAMPLE 2

According to the preceding example and with the same starting material, the etching was performed by employing 100 kg of Alumina Bayer and 179 kg of H Cl $(d 32 1.19)$, at a temperature of 110°C, for a reaction time of 8 hours and at a pressure of 0.5 kg/cm². The analysis of the obtained product showed the composition as:

| | |
|---|---|
| $Al_2O_3$ | 17 – 18 % |
| Cl | 22 – 24 % |

The approximate formula of obtained chlorohydroxide was $Al_2(OH)_2Cl_4$.

The unreacted residue, lying on the reactor bottom, was 10 – 15 % with respect to the starting amount fed to the reactor.

What we claim is:

1. The process of producing aluminum chlorohydroxide represented by the formula: $Al_2(OH)_xCl_y$, wherein $x$ and $y$ range from 1 to 3.5 and from 5 to 2.5, respectively, which consists of reacting aluminum oxide or hydroxide with an amount of hydrochloric acid which is from (1/2.5) to (1/4) of the stoichiometric amount for obtaining aluminum trichloride, at a temperature in the range from 100°C to 160°C, and at a pressure in the range from 0.1 kg/cm² to 4 kg/cm² for a period of from 2 to 10 hours.

2. The process of producing aluminum chlorohydroxide represented by the formula: $Al_2(OH)_xCl_y$, wherein $x$ and $y$ range from 1 to 3.5 and from 5 to 2.5, respectively, as claimed in claim 1, in which the hydrochloric acid is caused to react with a member of the group consisting of: alumina Bayer, bauxite, bayerite, gibbsite, hydrargillite, diaspore and boehmite.

* * * * *

UNITED STATES PATENT AND TRADEMARK OFFICE
CERTIFICATE OF CORRECTION

PATENT NO. : 3,909,439
DATED : September 30, 1975
INVENTOR(S) : Luigi Rivola and Bruno Notari It is certified that error appears in the above-identified patent and that said Letters Patent are hereby corrected as shown below:

Abstract, line 5, "(1/2.5) to (1/4)" should read

--1/2.5 to 1/4--.

Column 1, line 4, "aluminium" should read --aluminum--.

line 22, "as to" should be deleted.

line 27, "(1 to 1/4)/2.5)" should read

--1/2.5 to 1/4 of--.

Column 2, line 38, "(d 32 1/19)" should read --(d=1.19)--.

line 56, "(1/2.5) to (1/4)" should read

--1/2.5 to 1/4--.

Signed and Sealed this eighteenth Day of May 1976

[SEAL]

Attest:

RUTH C. MASON
Attesting Officer

C. MARSHALL DANN
Commissioner of Patents and Trademarks